United States Patent [19]

Absil et al.

[11] Patent Number: 5,126,298

[45] Date of Patent: Jun. 30, 1992

[54] CRACKING CATALYSTS COMPRISING CLAYS WITH DIFFERENT PARTICLE SIZES, AND METHOD OF PREPARING AND USING THE SAME

[75] Inventors: Robert P. L. Absil, Mantua; Jocelyn A. Kowalski, Clarksboro, both of N.J.

[73] Assignee: Mobil Oil Corp., Fairfax, Va.

[21] Appl. No.: 667,856

[22] Filed: Mar. 12, 1991

[51] Int. Cl.$^5$ .............................................. B01J 29/06
[52] U.S. Cl. ...................................................... 502/68
[58] Field of Search .......................................... 502/68

[56] References Cited

U.S. PATENT DOCUMENTS

| | | | |
|---|---|---|---|
| 3,354,096 | 11/1967 | Young | 252/435 |
| 3,384,602 | 5/1968 | Robinson | 502/68 |
| 3,472,617 | 10/1969 | McDaniel et al. | 502/68 |
| 4,454,241 | 6/1984 | Pine et al. | 502/68 |
| 4,515,903 | 5/1985 | Otterstedt et al. | 502/68 |
| 4,567,152 | 1/1986 | Pine | 502/64 |
| 4,584,091 | 4/1986 | Pine | 208/114 |
| 4,839,319 | 6/1989 | Schnette et al. | 502/64 |
| 4,873,211 | 10/1989 | Walker et al. | 502/64 |

FOREIGN PATENT DOCUMENTS

| | | | |
|---|---|---|---|
| 622273 | 6/1961 | Canada | 502/68 |
| 3197549 | 8/1988 | Japan | 502/68 |

*Primary Examiner*—Carl F. Dees
*Attorney, Agent, or Firm*—Alexander J. McKillop; Charles J. Speciale; Dennis P. Santini

[57] ABSTRACT

The present invention is directed to a novel catalyst useful in the cracking of hydrocarbons. The catalyst of the present invention is formed with at least one zeolite, a first clay having a first average particle size and a second clay having a smaller average particle size than the first clay, wherein at least one of the clays or the zeolite is first treated with a source of phosphorus, such as phosphoric acid. These components are mixed in a slurry and spray dried at a low pH. Thus the present invention is also directed to a process for preparing a zeolite catalyst. The catalysts of the present invention advantageously do not require calcination in order to obtain low attritability.

20 Claims, No Drawings

CRACKING CATALYSTS COMPRISING CLAYS WITH DIFFERENT PARTICLE SIZES, AND METHOD OF PREPARING AND USING THE SAME

This invention relates to catalytic cracking of hydrocarbons. More particularly, this invention relates to the preparation and use of novel zeolite cracking catalysts containing a zeolite, and at least two clays with different particle sizes, at least one of which has been treated with a source of phosphorus. These catalysts are highly attrition resistant and have improved activity for octane enhancement or light olefin production in catalytic cracking of crude oil.

BACKGROUND OF THE INVENTION

Catalytic cracking operations are commercially employed in the petroleum refining industry to produce useful products, such as high quality gasoline and fuel oils, from hydrocarbon-containing feeds. The endothermic catalytic cracking of hydrocarbons is most commonly practiced in accordance with two known catalytic cracking operations, namely, fluid catalytic cracking (FCC) and moving bed catalytic cracking.

Generally, both fluid catalytic cracking and moving bed operations are commercially practiced in a cyclic mode. During these operations, the hydrocarbon feedstock is contacted with hot, active, solid particulate catalyst without added hydrogen, for example, at pressures of up to about 50 psig and temperatures up to 1200° F. As the hydrocarbon feed is cracked in the presence of cracking catalyst to form more valuable and desirable products, undesirable carbonaceous residue known as "coke" is deposited on the catalyst. The spent catalyst contains coke as well as metals that are present in the feedstock.

In FCC operations, the catalyst is a fine powder with particle sizes of about 20-200 microns in diameter and with an average size of approximately 60-100 microns. The fine powder is propelled upwardly through a riser reaction zone, fluidized and thoroughly mixed with the hydrocarbon feed. The hydrocarbon feed is cracked at high temperatures by the catalyst and separated into various hydrocarbon products. The coked catalyst particles are separated from the cracked hydrocarbon products, and after stripping, are transferred into a regenerator where the coke is burnt off to regenerate the catalyst. The regenerated catalyst then flows downwardly from the regenerator to the base of the riser.

The cycles of cracking and regeneration at high flow rates and temperatures have a tendency to physically break down the catalyst into smaller particles, called "fines" which have a diameter of up to 20 microns as compared to the average diameter of the catalyst particle of about 60 to about 100 microns. In determining the unit retention of catalysts, and accordingly their cost efficiency, attrition resistance is a key parameter. While the initial size of the particles can be controlled relatively easily by controlling the initial spray drying of the catalyst, if the attrition resistance is poor, the catalystic cracking unit may produce a large amount of the 0-20 micron fines which should not be released into the atmosphere. Commercial catalytic cracking units include cyclones and electrostatic precipitators to prevent fines from becoming airborne. Those skilled in the art appreciate that excessive generation of catalyst fines increases the cost of catalyst to the refiner.

Additionally, the catalyst particles cannot be too large in diameter, or the particles may not be sufficiently fluidized. Therefore, the catalysts are preferably maintained under 120 to 150 microns in diameter.

Additionally, deposition of coke on the catalyst particles is generally considered undesirable for two reasons: first, it inevitably results in a decline in catalytic activity to a point where the catalyst is considered to have become "spent"; and second, coke generally forms on the catalyst at the expense of more desired light liquid products. To regenerate the catalytic activity, the hydrocarbon residues of the coke must be burnt off the "spent" catalyst at elevated temperatures in a regenerator.

Current worldwide refinery trends indicate a continuing need to process heavier feed stock. As a result, many refineries will be processing feedstock containing resins or deeper cut gas oils which have high metals contents. The enhancement of octane produced in catalytic cracking operations is an important goal in the preparation of zeolite containing catalysts. The environmental regulations in the U.S. and abroad, and the phaseout of lead additives for gasolines in both the U.S. and abroad, provide a strong incentive for refineries to use catalysts which produce increased octane gasolines from heavier metals contaminated feedstock.

Therefore, it would be highly desirable to prepare a catalyst having a high attrition resistance. It would also be desirable to provide fluid catalysts having reduced manufacturing costs. Costs can be reduced, for example, by eliminating steps, such as calcining the spray dried catalyst, in the manufacturing of the catalyst.

SUMMARY OF THE INVENTION

The present invention is directed to a novel catalyst useful in the cracking of hydrocarbons. The catalyst of the present invention is formed with at least one zeolite, a first clay having a first average particle size and a second clay having a smaller average particle size than the first clay, wherein at least one of the clays or the zeolite is first treated with a source of phosphorus, such as phosphoric acid. Thus the present invention is also directed to a process for preparing a zeolite catalyst. The catalysts of the present invention advantageously do not require calcination in order to obtain acceptable attrition indices, thereby reducing catalyst manufacturing costs.

DETAILED DESCRIPTION

The catalysts of one embodiment of the present invention may be prepared by a method wherein three slurries are separately prepared. The first slurry comprises a zeolite, the second slurry comprises a first clay such as Kaolin, and the third slurry comprises a clay having a different average particle size than the first clay, such as ball clay. The term "zeolite" as used herein designates the class of porotectosilicates, i.e., porous crystalline silicates, which contain silicon and oxygen atoms as the major components. Other framework components can be present in minor amount, usually less than about 14 mole %, and preferably less than 4%. These components include aluminum, gallium, iron, boron, etc., and combinations thereof. The crystalline aluminosilicates constitute an especially well known type of zeolite. Unless otherwise noted, all percentages herein are based on total solids.

Those skilled in the art will appreciate Kaolin clay typically has a particle size distribution of about 0.2-20 microns, most preferably averaging about 1-10 microns, while ball clay typically has a particle size distribution of about 0.2-10 microns, most preferably averaging about 0.4-0.6 microns. A source of phosphorus, for example phosphoric acid, is then added to one of these slurries.

According to this preferred method of the present invention, after the three slurries have been combined and any desired adjustments have been made to the solids percentage, the pH of the slurry mixture is adjusted to $\leq 3$ and most preferably to $\leq 2$. As described below with reference to the examples, it has been found that satisfactory attrition resistances are obtained in the absence of calcination of the spray dried catalyst. This results in a substantial reduction in catalyst manufacture costs.

One embodiment of the present invention is directed to a catalyst formed with phosphorus treated zeolite, a first clay, and a second clay having an average particle size smaller than that of the first clay. The catalysts of the present invention exhibit greater attrition resistance than catalysts similarly formed without phosphorus treatment of t e clay or without the use of clays with different average particle sizes.

According to another preferred embodiment of the present invention, wherein phosphoric acid is added to one of the clay slurries the contact time between the clay slurry and the phosphoric acid is limited. In this regard, the phosphoric acid is added to the clay slurry a short time period prior to mixing the clay/phosphoric acid slurry to the zeolite slurry. The time period is preferably limited to about 30 minutes, most preferably to less than 15 minutes.

The catalysts of the present invention are, therefore, formed in the absence of other non-zeolitic inorganic oxide matrices. As used herein, the phrase "other non-zeolitic inorganic oxide matrices" is meant to include oxide matrices such as silica, alumina, silica-alumina, magnesia, boria, titania, zirconia and mixtures thereof. The catalyst matrix of the present invention does not contain any added silica and/or alumina which are introduced as gels or sols.

In light of the relatively low pH of the slurry prior to spray drying, the zeolites used in practicing the present invention should be acid stable at a pH below about 3, most preferably in the pH range of about 1-2. As used herein, the term "acid stable" means that the zeolite will undergo minimal removal of the framework components, for example, aluminum, gallium, iron, boron, etc, which are usually present in minor amounts, in the stated pH range. Suitable acid stable zeolites have $SiO_2/Al_2O_3$ ratios greater than 20/1, preferably greater than 26/1, and most preferably greater than 35/1.

The zeolite may be a large pore zeolite such as USY, RE-USY, dealuminated Y, silica-enriched dealuminated Y, zeolite beta, or an intermediate pore zeolite such as ZSM-5, ZSM-11, ZSM-22, ZSM-23, ZSM-35, ZSM-48 or ZSM-57 or small pore zeolites including erionite and ZSM-34. According to the present invention the zeolite $SiO_2/Al_2O_3$ ratio is advantageously sufficiently high to minimize framework dealumination in the stated pH range. The high $SiO_2/Al_2O_3$ ratio zeolite can either be synthesized directly or can be obtained by, for example, steaming, followed by acid dealumination of a low $SiO_2/Al_2O_3$ ratio zeolite. The phosphorus-containing catalysts show improved catalytic performance over their phosphorus-free analogs.

The zeolite slurry may then be mixed with the phosphoric acid/clay slurries, or first with the source of phosphorus and then with the clay slurries. The final slurry solids are preferably adjusted to about 25 weight %. It may be necessary to adjust the pH of this slurry, particularly when sources of phosphorus other then phosphoric acid are utilized. After thorough mixing, the slurry is the spray dried to yield, for example, a catalyst having about 10-20% zeolite, about 70-85% clay and about 5-10 wt % phosphorus ($P_2O_5$).

Suitable sources of phosphorus include phosphoric acid, ammonium dihydrogen phosphate, ammonium monohydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite and mixtures thereof.

The following examples are provided to further illustrate the present invention. A series of ZSM-5 fluid catalysts containing 15 wt % 55/1 $SiO_2/Al_2O_3$ ZSM-5, clay and phosphorus were prepared.

EXAMPLE 1

A slurry containing 375 grams of dried 55/1 $SiO_2/Al_2O_3$ ZSM-5 crystals and 2.6 grams of Marasperse N-22 dispersant (Daishowa Chemicals Inc., Rothchild, Wis.) was diluted to 33% solids with DI water and ballmilled for 16 hours in a one-gallon porcelain ballmill containing agate stones. After ball-milling, the slurry was recovered and rinse water was added to the slurry to reduce the solids content to 20 wt %. 5106 g. of a Kaolin clay slurry was prepared containing 1953.5 g. of Kaolin (Georgia Kaolin Company, Elizabeth, N.J.). The Kaolin clay used in these examples had an average particle size of 2.4 microns. An $H_3PO_4$ solution was prepared by adding 275.7 grams of 86% $H_3PO_4$ to 1974 grams of DI water. The $H_3PO_4$ solution was added to the zeolite slurry over an 11 minute period. The pH of the phosphoric acid-treated zeolite slurry was 1.36. Next, the phosphoric acid zeolite slurry was added to the Kaolin slurry over an 11 minute period with stirring. After stirring for an additional 15 minutes, 909 grams of DI water were added; the pH was 1.68. DI water was added to adjust the percentage solids of the slurry to 25%. After homogenization, the slurry was spray dried. The resulting catalyst, identified herein as catalyst A, was calcined for two hours at 1200° F. in air.

Attrition Test

To determine the attrition index of the fluid catalyst, 7.0 cc of sample is contacted in a 1.0 inch U-tube with an air jet formed by passing humidified (60%) air through a 0.07 inch nozzle at 21 liter/minute for 1 hour. The attrition index is defined as the percent of 0-20 micron fines generated during the test relative to the amount of >20 micron material initially present.

$$AI = 100 \times \frac{\text{wt \% of fines } AA - \text{wt \% of fines } BA}{\text{wt \% of fines } BA},$$

where AA means after attrition, BA means before attrition and fines means wt % of 0-20 micron material. The lower the attrition index, the more attrition resistant is the catalyst.

The attrition indices of the spray-dried and the calcined catalysts were determined to be 12 and 8, respectively.

EXAMPLE 2

In this example the benefits of adding ball clay to the phosphoric acid Kaolin/zeolite slurry are illustrated. The ball clay used has a smaller mean average particle diameter (0.5 vs 2.4 microns), a higher organic content (3.3 vs 0.9 wt %), and a higher surface area (25 vs 14 m$^2$/g) than the Kaolin clay. A zeolite slurry containing 375 g of 55/1 $SiO_2/Al_2O_3$ ZSM-5 (dry basis) at 20% solids was prepared as described in Example 1. 4087.2 g. of a clay slurry was prepared containing 1562.8 g. of Kaolin. 1021.8 g. of a ball clay slurry was prepared containing 390.7 g of ball clay (Kentucky-Tennessee Clay Company, Mayfield, Ky.). An $H_3PO_4$ solution was prepared by adding 275 g of 86% $H_3PO_4$ to 1974 g of DI water. The $H_3PO_4$ solution was added to the zeolite slurry over a 15 minute period. The Kaolin slurry was then added over an 11 minute period. After 15 minutes of stirring, an additional 909 g of DI water was added. The ball clay slurry was then added over an 11 minute period. After stirring for 15 minutes, additional DI water was added to adjust the % solids of the slurry to 25%. After homogenization, the slurry was spray dried. The resulting catalyst, identified herein as catalyst B, was calcined for 3 hours at 1200° F. in air.

The attrition indices of the spray-dried and the calcined catalysts prepared in the present example were determined to be 5 and 6, respectively.

EXAMPLE 3

In this example the same phosphorus-treated ZSM-5/clay catalyst was prepared as in Example 2. The resulting catalyst was identified as catalyst C. The attrition indices of the spray-dried and the calcined (1200° F. for 2 hours) catalysts prepared in the present example were determined to be 7 and 7, respectively.

This example confirms the benefits of adding ball clay. For comparative purposes, a similar sample was prepared essentially following the procedure of Example 2 but replacing the ball clay with Kaolin.

EXAMPLE 4

A zeolite slurry containing 375 grams of 55/1 $SiO_2/Al_2O_3$ ZSM-5 (dry basis) at 20% solids was prepared as described in Example 1. 4087.2 g of a clay slurry was prepared containing 1562.8 g of Kaolin. 1021.8 g of a second Kaolin slurry was prepared containing 390.7 g of clay. In addition, an $H_3PO_4$ solution was prepared by adding 274.5 g of 86.1% $H_3PO_4$ to 1977.5 g of DI water. The $H_3PO_4$ solution was added to the zeolite slurry over a 15 minute period. The first Kaolin slurry was then added to the resulting slurry over an 11 minute period. After 15 minutes of stirring, an additional 909 g of DI water was added; the second Kaolin slurry was then added over an 11 minute period. After stirring for 15 minutes, additional DI water was added to adjust the % solids of the slurry to 25%. After homogenization, the slurry was spray dried. The resulting catalyst, identified herein as catalyst D, was calcined for 2 hours at 1200° F. in air.

The attrition indices of the spray-dried and the calcined catalysts prepared in the present example were determined to be 19 and 6, respectively. This confirms that the addition of the ball clay is responsible for the improvement in the attrition index of the spray dried catalyst.

In summary these examples demonstrate that addition of ball clay in a sufficient amount results in spray dried fluid catalysts with low attritability.

EXAMPLE 5

The base catalyst employed in the present study was a commercially-available REY-type catalyst which had been removed from a commercial FCC unit following oxidative regeneration. The catalyst is hereinafter referred to as Catalyst E.

EXAMPLE 6

Catalyst C was steam-deactivated at 1450° F. for 10 hours in 45% steam/55% air at 0 psig. The resulting catalyst was blended with catalyst E to a ZSM-5 concentration of 0.3 wt %. The blend prepared in this example will be referred to as catalyst F.

Catalysts E and F were evaluated for cracking a Sour Heavy Gas Oil, having the properties listed in Table 1, in a fixed-fluidized bed (FFB) unit at 960° F. over a range of catalyst/oil ratios. The performance of these catalysts at 65 vol % conversion was determined via interpolation, while catalytic activity for octane enhancement and selectivity were calculated. The results are shown in Table 2.

The catalytic results in Table 2 demonstrate the effectiveness of this ZSM-5 additive for increasing gasoline octane without affecting coke yield.

TABLE 1

| Properties of Joliet Sour Heavy Gas Oil | |
|---|---|
| Pour Point, °F. | 90 |
| CCR, wt % | 0.54 |
| K.V. 040° C. | N/A |
| K.V. 0100° C. | 8.50 |
| Aniline Point, °F. | 170.5 |
| Bromine Number | 8.7 |
| Carbon, wt % | 87.1 |
| Hydrogen, wt % | 12.1 |
| Sulfur, wt % | 2.1 |
| Nitrogen, wt % | 0.41 |
| Basic Nitrogen, ppm | 382 |
| Nickel, ppm | 0.3 |
| Vanadium, ppm | 0.4 |
| Iron, ppm | 0.3 |
| Copper, ppm | 20 |
| Sodium, ppm | 1.3 |

TABLE 2

| Catalyst Yield Distribution wt % (@ 65 vol % conv.) | E | F |
|---|---|---|
| Coke | 5.0 | 4.9 |
| $C_1$–$C_3$ | 7.4 | 11.3 |
| $C_4$ | 7.5 | 9.9 |
| $C_5+$ gasoline | 42.6 | 36.2 |
| LFO | 29.2 | 28.9 |
| HFO | 8.3 | 8.7 |
| RON | 90.7 | 92.9 |
| -change in $C_5+$ Gasoline/change in RON | | 3.5 |
| change in RON/wt % ZSM-5 | | 7.3 |

Catalytic cracking with the catalyst of the present invention can be conducted in any conventional catalytic cracking manner. Suitable catalytic cracking conditions include a temperature up to about 1200° F. and a pressure ranging from about subatmospheric to several atmospheres, typically from about atmospheric to about 4 atmospheres. The process may be carried out in a fixed bed, moving bed, ebullating bed, slurry, transfer line or fluidized bed operation. The catalyst of the present invention can be used to convert any of the conventional hydrocarbon feeds used in catalytic cracking, for example, naphthas, gas oils and residual oils having a high content of metallic contaminants. They are especially suited for cracking hydrocarbons boiling in the gas oil range, that is, hydrocarbons oils having an atmospheric pressure boiling point ranging from about 450° to about 1100° F. to yield products having a lower boiling point.

The catalysts of the present invention can be combined as separate particle additives with one or more catalytic cracking catalysts, such as a faujasite-type cracking catalyst, such as REY, USY, RE-USY, dealuminated Y and silicon-enriched dealuminated Y.

One embodiment of the present invention comprises a method of cracking hydrocarbons comprising the step of contacting the hydrocarbons with a mixture comprising a zeolite catalyst as described above and another molecular sieve catalyst. As used herein, the term "molecular sieve" includes adsorbents which selectively adsorb molecules on the basis of the size and shape of the adsorbate molecule. Molecular sieves have a sorption area available on the inside of a large number of uniformly sized pores of molecular dimensions such that molecules of a certain size and shape enter the pores and are adsorbed while larger or differently shaped molecules are excluded. Porotectosilicates are one type of molecular sieve.

We claim:

1. A method of preparing a zeolite cracking catalyst having a high attrition resistance comprising the steps of:
    forming a slurry comprising an acid stable zeolite;
    forming a first clay slurry comprising a first clay with a first average particle size;
    forming a second clay slurry comprising a second clay with a second average particle size which is less than said first average particle size;
    treating at least one of said slurries with a source of phosphorous;
    mixing at least portions of each of said slurries; and
    spray-drying said slurry mixture at a pH of below 3 thereby providing a catalyst with an uncalcined attrition index of $\leq 10$.

2. A method according to claim 1 wherein said slurry mixture is spray dried at a pH of $\leq$ about 2.

3. A method according to claim 1 wherein said second average particle size is about 0.2–10 microns.

4. A method according to claim 1 wherein said second average particle size is about 0.4–0.6 microns.

5. A method according to claim 1 wherein said first average particle size is about 0.2–20 microns.

6. A method according to claim 1 wherein said first average particle size is about 1–10 microns.

7. A method according to claim 1 wherein the difference between said first average particle size and said second average particle size is at least about 1.4 microns.

8. A method according to claim 1 wherein said first clay is Kaolin clay.

9. A method according to claim 8 wherein said second clay is ball clay.

10. A method according to claim 1 wherein said second clay is ball clay.

11. A method according to claim 1 wherein said source of phosphorus is selected from the group consisting of phosphoric acid, ammonium dihydrogen phosphate, ammonium monohydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, and mixtures thereof.

12. The method according to claim 1 wherein said source of phosphorus is phosphoric acid.

13. A catalyst made by the method according to claim 9.

14. A catalyst made by the method according to claim 7.

15. A catalyst made by the method according to claim 1.

16. A method of preparing a zeolite cracking catalyst having a high attrition resistance comprising the steps of:
    forming a zeolite slurry;
    forming a first clay slurry comprising a first clay with a first average particle size;
    forming a second clay slurry comprising a second clay with a second average particle size which is less than said first average particle size;
    treating at least one of said slurries with phosphoric acid;
    mixing at least portions of each of said slurries; and
    spray-drying said slurry mixture at a pH of below 3.

17. The method according to claim 16 wherein said second clay slurry is added in an amount sufficient to provide a spray dried, uncalcined catalyst with an attrition index $\leq 15$.

18. The method according to claim 16 wherein said second clay slurry is added in an amount sufficient to provide a spray dried, uncalcined catalyst with an attrition index $\leq 10$.

19. The method according to claim 16 wherein said first clay comprises Kaolin clay and said second clay comprises ball clay.

20. A method of preparing a zeolite cracking catalyst having a high attrition resistance comprising the steps of:
    forming a zeolite slurry;
    forming a first clay slurry comprising Kaolin clay with a first average particle size;
    forming a second clay slurry comprising ball clay with a second average particle size which is less than said first average particle size;
    treating at least one of said slurries with a source of phosphorus;
    mixing at least portions of each of said slurries; and
    spray-drying said slurry mixture at pH of $\leq 2$.

* * * * *